Figure 1:
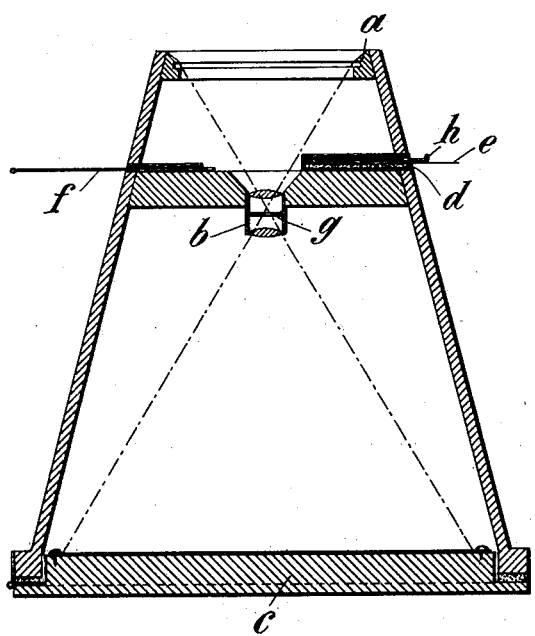

M. SCHÜTZE.
PHOTOGRAPHIC ENLARGING APPARATUS.
APPLICATION FILED OCT. 23, 1905.

910,322.

Patented Jan. 19, 1909.

Witnesses:
F. H. Logan.
George G. Schoenlank

Inventor:
MAX SCHÜTZE,
BY
HIS ATTORNEY

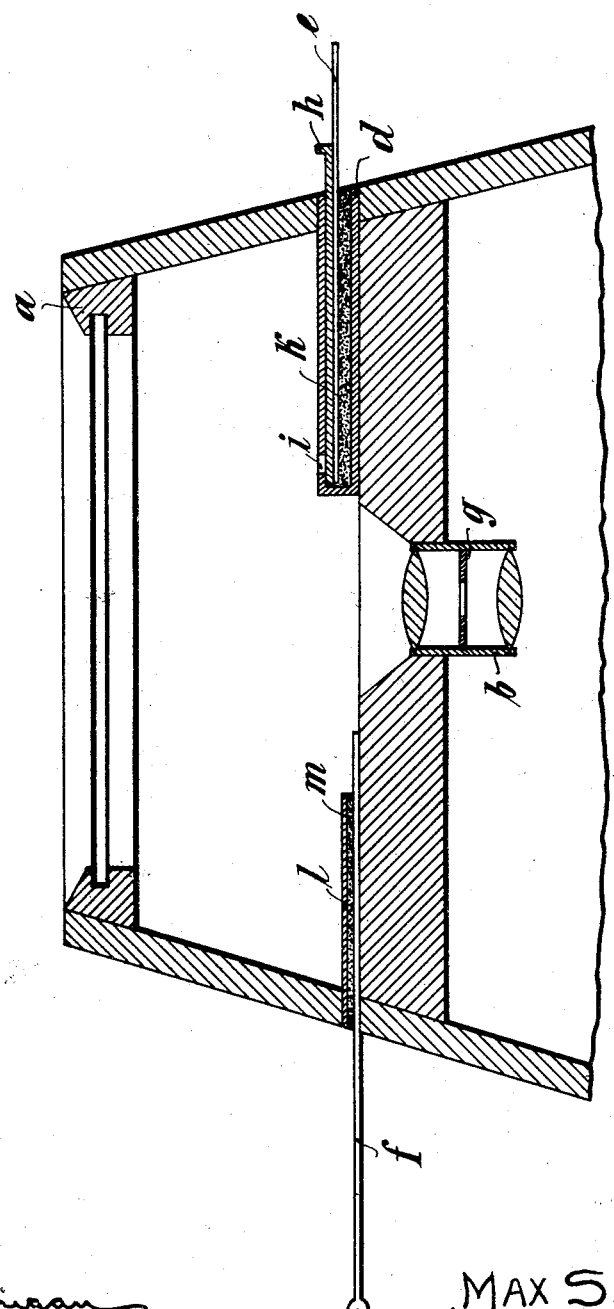

UNITED STATES PATENT OFFICE.

MAX SCHÜTZE, OF BERLIN, GERMANY.

PHOTOGRAPHIC ENLARGING APPARATUS.

No. 910,322.　　　Specification of Letters Patent.　　　Patented Jan. 19, 1909.

Application filed October 23, 1905. Serial No. 283,901.

*To all whom it may concern:*

Be it known that I, MAX SCHÜTZE, a citizen of Germany, residing at Berlin SW. 11, Königgrätzerstrasse 105, Germany, have invented a new and useful Improvement in Photographic Enlarging Apparatus; and I do hereby declare the following to be a full, clear, and exact description of the same.

My invention relates to improvements in photographic enlarging apparatus whereby the determination of the right time of exposure is facilitated.

In enlarging negatives by day-light it is usual to determine the right time of exposure by a previous trial exposure and development of small strips of bromid paper. This method is inconvenient and unreliable, as the testing strips must be put in and taken out in the dark-room and in the case of apparatus without dark slides involves the repeated carrying to and fro of the whole apparatus, and moreover the developing of the numerous testing strips is troublesome and causes loss of time, and the day-light may have entirely changed during the removal and development of the testing strips, whereby all that has been determined is rendered useless.

The present enlarging apparatus obviates these disadvantages, a result which is substantially realized by the arrangement in the side of the apparatus between the negative carrier and the lens of a light-tight closable slide, which enables the right time of exposure to be determined by means of a simple photometric measurement effected in the fore-chamber of the apparatus after the negative has been duly placed. As the intensity of the light which reaches the sensitized layer in the back-chamber of the apparatus is always proportional to the intensity of the light falling in the fore-chamber of the apparatus on to the photometer, no matter whether the day-light be powerful or slight and the negative which is to be enlarged be thick or thin, it is only necessary that the manufacturer of the apparatus should ascertain once for all the degree indicated by the photometer with the proper exposure, and the person using the apparatus only needs to expose the sensitive layer under the negative to the day-light until this degree of the photometer is attained, in order always to obtain suitable exposure of the sensitive layer with any other intensity of day-light and any other negatives.

By suitable determination of the diaphragm opening and the employment of a photometer of the right kind and proper sensibility, and its suitable arrangement in the apparatus, etc., the period of photometric measurement may be made to agree exactly with the right time of exposure. If the photometer be then placed outside the active rays, that is to say the rays of light by means of which the enlargement is effected, the photometric measurement and the enlargement can be effected simultaneously, whereby the operator not only saves time but is independent of the changes in the intensity of the day-light, as every change acts in precisely the same manner on the photometer and on the sensitive layer.

After each enlargement the photometer may be removed from the apparatus. It is preferable, however, that the photometer should be fixed in the apparatus, outside the active rays of light.

The simplest form for the photometer is that of a small box with an opening in the end for the introduction of the photometer paper and a second opening in the top for exposing the photometer paper. The box is arranged in the fore-chamber of the apparatus outside the active rays in such a manner that the opening in its end lies on the slide in the side of the apparatus, so that the photometer paper can be put into the box from outside.

If it be desired to employ several sorts of sensitive material of different degrees of sensitiveness in the same apparatus for producing enlargements, or to use an adjustable apparatus of different ratios of enlargement, the apparatus must be provided with several diaphragms with openings of different widths or with one adjustable diaphragm, similar to that on the objective of the photographic cameras, or slides made of more or less transparent material can be pushed in over the photometer paper, for the purpose of enabling the right time of exposure to be photometrically determined for each sort of sensitive layer or for each ratio of enlargement.

In the accompanying drawings a form of the invention is shown by way of example.

Figure 1 shows a vertical section of the apparatus; Fig. 2 an enlarged vertical section of the upper part of the apparatus.

The enlarging apparatus consists as usual of the negative carrier *a*, which receives the negative that is to be enlarged, and the lens *b* which throws an enlarged image of the negative on to the copy carrier c, on which the sensitive layer (for example a plate or paper coated with bromid of silver) is fixed.

In the apparatus between the negative carrier a and the lens b, outside the active rays of light (shown in dotted lines), a small pasteboard box d is arranged one (right) end of which is pasted into an opening in the side wall of the apparatus. The left end of the box d has a small opening i in the top. A small strip of photometer paper e is pushed into the box when the apparatus is used. The bottom of the box is covered with velvet or plush k for the purpose of preventing light from entering directly through the box into the apparatus. A slide h can be pushed into the box, in order to close the opening i during the removal and examination of the strip e. Or the left wall of the apparatus can be provided with an opening into which a pasteboard l covered with velvet or plush m is pasted and into which, during the examination of the strip e, a slide f is pushed, until it closes the whole opening over the lens b. For the usual work, however, the slides h and f can be dispensed with, the velvet or plush k in the box d preventing in a sufficient degree the entrance of the light through the box into the apparatus, even after the removal of the strip e. The diaphragm g of the lens is so adjusted that the sensitive layer is accurately exposed, when there is a slight darkening of the photometer paper e below the exposure opening in the box. The slide h may also be made of more or less transparent material (for example white or colored silk-paper, gelatin, celluloid or the like) and be employed for exactly adjusting the right time of exposure, especially when different sorts of sensitive layers are employed.

The apparatus is used in the following manner: The negative that is to be enlarged is placed in the negative carrier a and the bromid paper or the like fixed on the copy carrier c in the dark-room. At the same time a fresh strip of the photometer paper e (for example celloidin paper) is introduced into the box d. The apparatus is then so placed that the day-light can enter. From time to time the strip of the paper e is drawn out and examined to see whether the necessary dark tone has appeared in the part which lay below the opening in the top of the box. When the dark tone is attained, the exposure is discontinued, the development effected and the enlargement fixed in the usual manner.

If the apparatus be adjustably arranged for the employment of several sorts of sensitive material of different degrees of sensitiveness (for example bromid paper and plates covered with bromid of silver) or for the production of different ratios of enlargement, it is necessary as a matter of course before the enlargement is taken, to take that diaphragm or to push in that slide which belongs to the employed kind of sensitive material and ratio of enlargement.

For the usual work, i. e. enlarging photographic negatives on paper, the slide h can be omitted because there is no need of closing the opening i. But when the enlargement is produced on a very sensitive glass plate or film, it is sometimes better to close the opening i by means of the slide h during the inspection of the strip e, because, otherwise, a little day-light could pass through the box d in spite of the velvet k, while the paper strip e is removed therefrom. This light would be reflected to the inner surface of the apparatus and of the negative and from here through the lens b to the sensitive glass plate or film fixed on the copy carrier c, where it would produce dark spots or clouds.

I am well aware that enlarging cameras and photometers and actinometers are already known. My invention, however, consists not in the mere juxtaposition or aggregation of both devices, but in an improved enlarging camera provided with a small opening, in the side-wall between the negative carrier and the lens, through which opening the photometer paper can be introduced into the apparatus. The use of an actinometer in the common way is very tedious, because the negatives to be enlarged have not the same darkness, and darker or denser negatives require a longer exposure in the enlarging camera than clearer or lighter negatives. Thus, the time of exposure must be determined for each special negative by means of the photometer and of trial exposures, before the enlarging process can begin. Therefore photometers were hitherto not used for enlarging purposes. With my improved enlarging camera, these tedious trial exposures are dispensed with, because the actinometer is arranged within the apparatus below the negative, so that the day-light falling upon the actinometer has already passed the negative. Thus, a darker negative, acting slower upon the sensitive material, retards also in the same degree the action of the day-light upon the actinometer.

Having thus described my invention what I claim as such and desire to secure by Letters Patent is:—

1. Photographic enlarging apparatus, consisting of a negative carrier, a copy carrier, a lens situated between the negative carrier and the copy carrier, and walls made of light-tight material and provided with an opening between the negative carrier and the lens support for insertion of actinometer paper into the apparatus.

2. Photographic enlarging apparatus, consisting of a negative carrier, a copy carrier, a lens situated between the negative carrier and the copy carrier, walls made of light-tight material and provided with an opening between the negative carrier and the lens support, for insertion of actinometer paper into the apparatus, and a diaphragm to control the proper exposure of sensitive material upon the copy carrier.

3. Photographic enlarging apparatus, consisting of a negative carrier, a copy carrier, a lens situated between the negative carrier and the copy carrier, and provided with a diaphragm, and walls made of light-tight material and provided with a light-tight closable opening, between the negative carrier and the lens support, for insertion of actinometer paper into the apparatus.

4. Photographic enlarging apparatus, consisting of a negative carrier, a copy carrier, a lens situated between the negative carrier and the copy carrier and provided with a diaphragm, a device between the negative carrier and the lens support and to the one side of the lens, having an opening for exposing the actinometer paper and light-tight walls inclosing said carriers, lens, diaphragm and device, and having an opening near said device for insertion of actinometer paper into the said device.

5. The combination of an enlarging outfit having a lens, with an actinometer situated to one side of said lens, for darkening the actinometer paper by rays coming through the negative and simultaneously with the printing of the picture.

In testimony whereof, I have signed my name to this specification in the presence of two subscribing witnesses.

MAX SCHÜTZE.

Witnesses:
　HENRY HASPER,
　WOLDEMAR HAUPT.